Patented Sept. 5, 1944

2,357,650

UNITED STATES PATENT OFFICE 2,357,650

PUNCTURE SEALING COMPOSITION AND MANUFACTURE THEREOF

Lloyd A. Hall, Chicago, Ill., assignor to Blanche R. Connolly, Rockville Centre, N. Y.

No Drawing. Application April 8, 1940, Serial No. 328,596

3 Claims. (Cl. 260—749)

The present invention relates to compositions for preventing leakage of air through elastic materials, being concerned particularly with compositions which will seal punctures or other perforations in pneumatic tires and tubes, and to a method of producing the same.

Many tire sealing compositions have heretofore been developed for the purpose of preventing the escape of air from punctured pneumatic tires. Those preparations that contain materials capable of sealing such punctures, usually have a short effective life because of the tendency of the product to dry up and lose its sealing qualities or characteristics by being unable to flow into the perforations. The loss of moisture and consequent dryness will also prevent the compound from uniformly distributing itself within the tire, thereby causing the wheel to become unbalanced, thus producing wheel shimmy at high speeds. Attempts at overcoming these undesirable properties have resulted in the use of fluid products which have an excessive moisture content and, therefore, seep through the puncture to decompose the casing fabric with consequent corrosion of the wheel rim.

In accordance with the present invention, a product is prepared whose puncture-sealing characteristics are unaffected over an indefinite length of time and through hard usage. The product of this invention has the ability not only thoroughly to distribute itself uniformly on the surfaces of the air container, but to maintain the proper fluidity and uniform consistency even at temperatures much below the freezing point, and at temperatures higher than the boiling point of water. It also effectively seals large as well as small perforations and thus prevents the escape of air at a rapid rate, thus preventing blow-outs and accidents resulting therefrom. Further, my invention improves the elastic qualities of the rubber in the air container.

The product of the present invention contains as an essential adhesive ingredient a substantial proportion of a cold swelling starch, present in colloidal condition. With the cold swelling starch may be incorporated a plasticizer such as glycerine or ethylene glycol; a fibrous binder such as asbestos fiber; a filler such as granulated rubber; and of course a fluid such as water to form the other phase of the colloidal suspension of the cold swelling starch.

Other inert gelling materials such as gum karaya, gum tragacanth, locust beam gum, methyl cellulose, dextrins, starches, and other similar materials may also be employed with the cold swelling starch.

Other fibers may be used in place of the asbestos, for example hair, but it is preferred to use No. 4 Long Asbestos Fiber.

The filler is preferably granulated rubber, for example from 8 to 200 mesh. Because of its plasticity and also probably because of its similarity to the tire materials, rubber has proved more effective than other filling ingredients, but cork or sawdust may be substituted for it if necessary.

A small amount of a soluble, neutral, ionizable salt, preferably sodium chloride, is also included in the composition. The function of the salt is not completely understood. It acts to lower the freezing point and lower the vapor pressure of the composition, but it also appears to improve the fluidity and permanence of the material in other ways. Strangely enough, the salt does not have any salting out effect upon the colloid.

The preferred composition has the following ingredients:

| | Parts by weight |
|---|---|
| Cold swelling starch | 12 |
| Glycerine | 60 |
| Water | 55 |
| Asbestos fiber | 3 |
| Salt | 8 |
| 20 mesh granulated rubber | 7 |
| 80 mesh granulated rubber | 4 |
| Water soluble dye | 0.5 |

The composition is prepared by mixing the cold swelling starch and glycerine in a covered steam jacketed kettle equipped with an agitator. The materials are mixed cold, after which heat is applied until the temperature has risen to 160° F., agitation being carried out during the heating. The rubber is then added, and agitation is continued for another 15 minutes, the temperature being held at approximately 160° F. during this mixing and agitation. In the meantime the salt is dissolved in approximately half of the water and this is added to the mixture, care being taken not to cool the mixture thereby. The asbestos is wetted with the other half of the water and added to the mixture in the same way. The dye is then added with sufficient water to dissolve it.

The temperature is then raised until it has reached 240° F., and it is kept there for about 15 minutes, agitation being continued during all of this time.

The jacket is then disconnected from the steam and the jacket filled with cold water, the product being gradually cooled until it reaches a temperature of about 120° F., after which it is filled into a container.

As another example of the invention, one part by weight of cold swelling starch, 5 parts by weight of ethylene glycol, 9 parts by weight of glycerine, and 9 parts by weight of water were prepared in the same manner. This type of composition is usable chiefly for filling small punctures. Salt and asbestos fiber may be incorporated with this mixture for the same purposes as in the preceding example. A similar composition may be prepared by using 1.5 parts of cold swelling starch, 6 parts of glycerine, 11 parts of water, and 4.5 parts of ethylene glycol.

In general the amount of hygroscopic agent or plasticizer is from 4 to 15 times as great as the amount of cold swelling starch, but in spite of the small amount of the starch used, its characteristics dominate the composition.

The amount of water used depends upon the other ingredients of the mixture. That is, with larger quantities of hygroscopic agents, more water is necessary to produce a proper colloidal solution of the starch. The water will generally be from 4 to 10 times the amount of the starch, the amount in any case being readily determinable by test of the proper fluidity.

The cold swelling starch here referred to mixes well with glycerine, ethylene glycol, sorbitol, or glucose, and does not undergo cooking changes while it is being heated. It has high adhesive properties, and maintains stability as an adhesive over indefinite periods of time and under the most severe conditions of heat or cold. The amylose and amylo pectin are no longer present separately, but they are so consolidated as to form a homogeneous mass which has the properties of pure amylo pectin. This will cause a paste of cold swelling starch to form in cold water, for example, and in the presence of glycerine this paste assumes an extensibility and elasticity which is similar and comparable to gum rubber. In other words, it assumes gum-like properties similar to the rubber container in which it is used. It appears almost impossible to break down the adhesive properties of this cold swelling starch mixture.

Cold swelling starches, as here disclosed, when mixed with a quantity of cold water of many times their weight—say 15 to 20 times the weight of the starch—will form a thick adhesive mass, and with great amounts of water will form a good and tolerably permanent dispersion. Raw starches require cooking for solution and at the cooking temperatures the starch tends to lose its adhesive qualities, whereas the cold swelling starch does not lose these desirable characteristics. I may obtain a satisfactory composition by not heating the cold swelling starch mixture to as high a temperature as I have herein indicated, but the heating is done particularly to assure the stability of the product when it has been put into the tire container and the temperature therein reaches the high temperatures which are often obtained during summer weather.

The granulated rubber serves as a plug or a filler for small punctures. Larger holes or openings are also effectively sealed by the granulated rubber which is held together along with the other ingredients, by the asbestos fiber. Essentially it is the rubber which seals the larger holes, aided by the structural binding action of the asbestos, and by the additional filling, consolidating and adhesive action of the cold swelling starch, gums or flours. The cold swelling starch or gums or flours, provide a base for the compound, and assist in maintaining in the product a semi-pasty consistency through its ability to absorb from 7 to 30 times its weight in water. The glycerine acts with the cold swelling starch to improve the elastic properties of the product, and it also assists in keeping the mixture in a fluid form during extremely cold weather, and prevents evaporation of water during extremely hot weather. Also, by lowering the freezing point during cold weather, it assures the free-flowing of the compound at extremely low temperatures. In its ability to maintain the composition in a moist and uniform condition, the glycerine is aided by the sodium chloride which, of course is an anti-freezing agent. Ethylene glycol, and/or sorbitol, can be used in place of glycerine and evidences the same properties and characteristics in the composition as have been noted for the glycerine.

The glycerine also helps to prevent any excess water or moisture from seeping through perforations because it assists in maintaining an extreme viscous condition of the composition even though it is free-flowing.

Tests on the use of the invention in rubber containers have indicated that the elastic properties of the rubber are improved greatly. Tires and tubes treated with my composition will withstand greater stresses and strains, and consequently last for a considerably longer period, especially since the composition does not attack rubber or harden with age. The ability of my composition to flow freely though slowly at all times, and at extremely high and low temperatures, insures uniform distribution of the composition on the surface of the tire or tube, thus eliminating unbalancing of the wheels and such obvious detrimental effects at high driving speeds.

The composition is easily injected into pneumatic tubes through the air inlet valve. Inflation of the tube will produce a thorough cleaning of the valve mechanism.

The term "polyhydric alcohol" as used in the claims hereof, includes glycerine, glycols and sugars.

The term "cold swelling starch" is well understood in the industry to mean starch which does not require the use of hot water to swell it. Such a starch is described and shown in Oltmans Patent 2,105,052. Such cold swelling starches have properties markedly different from ordinary starches not only in their ability to respond to the action of cold water but in their strength and in their gelling properties.

The foregoing description is given for clearness of understanding only, and no unnecessary limitations should be understood therefrom.

What I claim as new, and desire to secure by Letters Patent, is:

1. A free-flowing puncture sealing composition comprising a cold swelling starch, water in the amount of 4 to 10 times the amount of the cold swelling starch, a polyhydric alcohol in a quantity from 4 to 15 times the amount of the cold swelling starch, a small amount of a fibrous material, and a small proportion of granulated rubber.

2. A free-flowing puncture sealing composition comprising a cold swelling starch, water in the amount of 4 to 10 times the amount of the cold swelling starch, a polyhydric alcohol in a quantity from 4 to 15 times the amount of the cold swelling starch, a small amount of a fibrous material, a small proportion of granulated rubber, and a small proportion of sodium chloride.

3. A puncture sealing composition having the following approximate composition:

| | Parts by wgt. |
|---|---|
| Cold swelling starch | 12 |
| Glycerine | 60 |
| Water | 55 |
| Asbestos fiber | 3 |
| Sodium chloride | 8 |
| 20 mesh granulated rubber | 7 |
| 80 mesh granulated rubber | 4 |

LLOYD A. HALL.